UNITED STATES PATENT OFFICE.

JAKOB SCHMID AND KARL JEDLICKA, OF BASLE, SWITZERLAND, ASSIGNORS TO THE SOCIETY OF CHEMICAL INDUSTRY IN BASLE, OF SAME PLACE.

DARK-GREEN DYE.

SPECIFICATION forming part of Letters Patent No. 562,200, dated June 16, 1896.

Application filed January 24, 1896. Serial No. 576,680. (Specimens.)

*To all whom it may concern:*

Be it known that we, JAKOB SCHMID and KARL JEDLICKA, citizens of the Swiss Republic, and residing at Basle, Switzerland, have invented certain Improvements in the Manufacture of Dyes or Coloring-Matters, of which the following is a clear and complete specification.

Since the application for Letters Patent, filed September 5, 1895, Serial No. 561,576, patented as No. 557,440, dated March 31, 1896, we have found that the unsymmetric diazo coloring-matter for wool, described in the specification of the said application, which directly dyes animal fiber in shades varying from blue black to black, can be transformed into a coloring-matter which dyes with more blue or more green shades. This transformation is easily effected by heating, in either a close or an open vessel, the coloring-matter in the acid state with water, or in the state of salts with an aqueous solution of certain mineral or organic substances, such, for instance, as mineral acids, (hydrochloric, sulfuric, nitric, phosphoric, boric, &c., acids,) organic acids of the fat and aromatic series, (oxalic, acetic, benzoic, phtalic, &c., acids,) or certain mineral salts, especially zinc chlorid. According to the duration of the reaction, the temperature at which it takes place, and the condensing agent employed, the transformation is effected more or less quickly, with evolution of ammonia, and so, by stopping the reaction sooner or later, the coloring-matter obtained dyes from blue black to green black. The reaction, which takes place with advantage in aqueous solution or by suspending the coloring-matter in the liquid, can evidently be simplified by dispensing with separation of the coloring-matter described in the previous specification, and directly applying to the product obtained by means of the reactions set forth in that specification, the process which is the object of the present invention.

The production of the new dye or coloring-matter will be clearly understood from the following examples:

*Example I. Production of the dye derived from the diazo unsymmetric coloring-matter obtained by the combination of naphthalene-diamin-disulfo-acid 1.8.3.6 with diazo-benzene and paranitrodiazo-benzene.*—Five kilos of the coloring-matter obtained according to the first example of the specification of application of Letters Patent above mentioned, by the successive combination of naphthalene-diamin-disulfo-acid 1.8.3.6 with diazo-benzene and paranitrodiazo-benzene, are dissolved in one hundred liters of water. To the solution thus obtained are added five kilos of acetic acid, and the whole is then heated on the water-bath for about eight hours or until a sample taken from the mass does not change or changes only a little in color, or, finally, until the mass has obtained the desired shade. It is then neutralized with carbonate of soda, and the new coloring-matter is precipitated by sea-salt, filtered, pressed, and dried. It forms a powder with bronze luster, readily soluble in water with a blue-green color, and it dyes wool (non-mordanted or mordanted with chrome) in an acid-bath green-black to dark-green tints, fast against washing and light. It dissolves in concentrated sulfuric acid with a blue-green coloration and is difficultly soluble in alcohol and insoluble in ether and benzene. A similar coloring-matter, but of a greener shade, is obtained if, in this example, instead of diazo-benzene, alpha-diazo-naphthalene is employed.

*Example II. Production of the dye derived from the diazo unsymmetric coloring-matter obtained by the combination of naphthalene-diamin-disulfo-acid 1.8.3.6 with para-nitro-diazo-benzene and paradiazo-benzene-sulfo-acid.*—Twenty kilos of the coloring-matter resulting from the combination of naphthalene-diamin-disulfo-acid 1.8.3.6 with paranitrodiazo-benzene and paradiazo-benzene-sulfo-acid, according to the example 2 of the specification of Letters Patent above mentioned, are dissolved in five hundred liters of water. Twenty kilos of zinc chlorid are added and the whole is then heated to boiling. The color of the solution, first violet, changes gradually to blue, and after three to four hours boiling, it no longer undergoes any change on addition of acid or of carbonate of soda. The coloring-matter is collected on precipitation with sea-salt.

*Example* III. *Production of the dye derived from the diazo unsymmetric coloring-matter obtained by the combination of naphthalene-diamin-disulfo-acid* 1.8.3.6 *with paranitro-diazo-benzene and the diazo derivative of naphthylamin-disulfo-acid G.*—Ten kilos of the coloring-matter obtained by the combination of naphthalene-diamin-disulfo-acid 1.8.3.6 with paranitrodiazo-benzene and the diazo derivative of naphthylamin-disulfo-acid G, are heated to boiling with an aqueous solution of oxalic acid of two per cent. The transformation of the coloring-matter into a new green-black coloring-matter quickly takes place and is completed at the end of about half an hour. The coloring-matter thus formed is separated from its intense-green solution in the manner indicated above. Instead of effecting the reaction in acid solution, there may be added to the solution of the coloring-matter which is to be transformed only the quantity of acid necessary to transform the coloring-matter in the color acid, the solution of which being then heated to boiling. The transformation into the new coloring-matter is thus completed but somewhat more slowly.

The products obtained according to the foregoing examples II and III have the same specified properties as the dye described in example I.

Having thus described our invention, what we claim is—

1. The process for the production of a new dye, by heating with water the unsymmetric diazo coloring-matter derived from one molecule of naphthalene-diamin-disulfo-acid 1.8.3.6, one molecule of paranitrodiazo-benzene and one molecule of the diazo derivative of another aromatic monoamido compound, in the form of the color acid, as described.

2. The process for the production of a new dye by heating the unsymmetric diazo coloring-matter derived from one molecule of naphthalene-diamin-disulfo-acid 1.8.3.6, one molecule of paranitrodiazo-benzene and one molecule of the diazo derivative of another aromatic monoamido compound, with water in the presence of a suitable condensing agent, as described.

3. As a new article of manufacture the herein-described dye derived from the unsymmetric diazo coloring-matter obtained with one molecule of naphthalene-diamin-disulfo-acid 1.8.3.6, one molecule of paranitrodiazo-benzene and one molecule of the diazo derivative of another aromatic monoamido compound, which dye constitutes in dry state a dark powder of bronze luster, is easily soluble in water with a green-blue to dark-green coloration and in concentrated sulfuric acid with a blue-green coloration, only slightly soluble in alcohol, insoluble in ether and benzene and produces on non-mordanted and chromed wool green-black to dark-green tints fast against washing and light.

In witness whereof we have hereunto signed our names in the presence of two subscribing witnesses.

JAKOB SCHMID.
KARL JEDLICKA.

Witnesses:
GEORGE GIFFORD,
AMAND RITTER.